United States Patent
Lee

(10) Patent No.: US 6,172,827 B1
(45) Date of Patent: Jan. 9, 2001

(54) DEVICE FOR RECORDING SIGNAL SO AS TO FACILITATE EFFECTIVE DROPOUT COMPENSATION

(75) Inventor: Chang-Rok Lee, Kwacheon (KR)

(73) Assignee: Samsung Electronics Co., Ltd., Kyungki-Do (KR)

( * ) Notice: Under 35 U.S.C. 154(b), the term of this patent shall be extended for 0 days.

(21) Appl. No.: 09/399,946

(22) Filed: Sep. 20, 1999

Related U.S. Application Data

(63) Continuation-in-part of application No. 08/723,279, filed on Sep. 30, 1996, now abandoned.

(30) Foreign Application Priority Data

Sep. 30, 1995 (KR) .................................................. 95-34007

(51) Int. Cl.[7] .................................................... G11B 5/86
(52) U.S. Cl. ................................ 360/15; 360/31; 369/84; 386/47
(58) Field of Search ................................ 360/15, 31, 55, 360/67, 68; 369/84; 386/2, 47, 76, 114

(56) References Cited

U.S. PATENT DOCUMENTS

| | | |
|---|---|---|
| 4,811,122 | 3/1989 | Kido et al. . |
| 5,057,934 | 10/1991 | Yun . |
| 5,103,349 | 4/1992 | Sochor . |
| 5,194,963 | 3/1993 | Dunlap et al. . |
| 5,469,306 | 11/1995 | Hara . |
| 5,761,370 | 6/1998 | Kim . |

*Primary Examiner*—Alan T. Faber
(74) *Attorney, Agent, or Firm*—Sughrue, Mion, Zinn, Macpeak & Seas, PLLC

(57) ABSTRACT

A signal recording device includes a signal inputting unit for inputting a signal to be recorded on a recording medium, as well as a dropout detector which detects a dropout portion of a signal output from the signal inputting unit and generates a pulse signal corresponding to the detected dropout portion. A muter mutes the signal output from the signal inputting unit during the pulse signal period. The signal recording device records on a recording medium, a signal output from the signal muter during the pulse signal period and a signal output from the signal inputting unit during all other times. Therefore, in the signal recording device of the present invention, since a signal during a dropout period is muted before being recorded, upon playback of the recorded signal, a dropout compensator in a reproducing device identifies the muted signal period as the dropout period and accurately compensates for the dropout. Therefore, noise caused by the dropout can be prevented.

17 Claims, 4 Drawing Sheets

DEVICE FOR RECORDING SIGNAL SO AS TO FACILITATE EFFECTIVE DROPOUT COMPENSATION

This is a continuation of Application No. 08/723,279 filed Sep. 30, 1996, (now abandoned) the disclosure of which is incorporated herein by reference.

BACKGROUND OF THE INVENTION

1. Field of the Invention

The present invention relates to a device for recording a signal so as to facilitate effective dropout compensation, and more particularly, to a signal recording device suitable to compensate during playback for a dropout which is generated when a signal is copied in a high-speed dubber of a dual tape deck.

2. The Background Art

Dropout indicates a phenomenon in which noise is generated on a screen by a temporary decrease in the level of, or temporary omission of a playback signal resulting from a partial damage to a recording medium, such as a scratch on a magnetic tape.

A dual tape deck, high-speed dubber, having first and second decks, copies a signal reproduced from a tape of the first deck to a tape of the second deck. When the signal is reproduced in the first deck at a speed N times higher than normal, it is also recorded at a speed N times higher than normal in the second deck. Thus, a high speed dubber can be realized in which dubbing can be performed even at an N-multiple speed. In such a high speed dubber, a luminance signal and a color signal are separately recorded when a signal output from the first deck is recorded to the second deck. A luminance-component FM signal is directly recorded, while only a frequency component of the color signal passed by a low pass filter is recorded.

FIG. 1 is a schematic view of a dropout compensator (DOC) in a general reproducing system. The DOC is comprised of a dropout detector 10, a switching circuit 16, a switch driver 12, and a delay 14 for delaying a signal for one horizontal scanning period.

FIGS. 2A through 2E illustrate the waveforms of signals used to explain the operation of the device of FIG. 1. FIG. 2A illustrates the waveform of an input signal including a dropout. The dropout detector 10 detects a dropout period and generates a gate pulse during the same period as shown in FIG. 2B. The gate pulse shown in FIG. 2B is completely synchronized to coincide with the dropout period of the input signal (see FIG. 2A). The switch driver 12, driven by the gate pulse (see FIG. 2B),activates the switching circuit 16 during the gate pulse period. That is, the switching point of the switching circuit 16 is changed from 16b to 16a during the period the gate pulse is high.

The one horizontal scanning period delay 14 outputs a signal from a previous scan line which has been delayed for one horizontal scanning period (see FIG. 20). Thus, by switching the switching circuit 16 the dropout is compensated to match the signal present before the one horizontal scanning period (see FIG. 2D). The input signal of FIG. 2A is mixed with the compensation signal of FIG. 2D to form a signal free of dropout inducing noise, as shown in FIG. 2E.

FIG. 3 is a block diagram of a conventional signal recording device. The conventional recording device has an input amplifier 200 for amplifying a small signal picked up by a head, a limiter 210 for limiting the signal output from the input amplifier 200 to be within a predetermined amplitude range, and a recording amplifier 220 for amplifying the signal output from the limiter 210.

The operation of the conventional recording device will now be described. A playback signal picked up by the head is amplified in the input amplifier 200, and limited to be within a predetermined amplitude range in the limiter 210. The output signal from the limiter 210 is amplified in the recording amplifier 220. Here, noise components during the dropout period are also amplified in the recording amplifier 220 and recorded on a recording medium.

FIGS. 4A through 4C are a series of waveforms explaining the operation of the signal recording device shown in FIG. 3. FIG. 4A is the waveform of a signal output from the input amplifier 200, showing a dropout signal amplified along with a normal playback signal. FIG. 4B is a signal waveform obtained by limiting the amplitude of the amplified signal to a predetermined level in the limiter 210. From FIG. 4B, it can be seen that limiting the amplitude of the normal playback signal makes it difficult to differentiate the normal playback signal from the dropout signal.

FIG. 4C is a signal waveform recorded as described above and input to a reproducing device. This waveform shows that the dropout period cannot be identified in the input signal. That is, when the input signal is reproduced, the reproducing device treats the dropout signal in the same manner as that for the normal signal without identifying the dropout period. This results in noise appearing on a screen due to a signal recorded during the dropout period.

As described above, in case that a signal is recorded using the conventional recording device, a reproducing device performs a signal reproduction without identifying an original dropout period in the input signal during playback, thereby generating noise due to a signal reproduced during the dropout period.

SUMMARY OF THE INVENTION

To circumvent the above problems, an object of the present invention is to provide a signal recording device which mutes a dropout portion of a signal during recording so as to enable effective compensation for the original dropout during playback.

To achieve the above object, there is provided a device for recording a signal so as to facilitate effective dropout compensation. The device includes a means for inputting a signal to be recorded on a recording medium; means for detecting a dropout portion of a signal output from said signal inputting means and generating a pulse signal corresponding to said detected dropout portion; means for muting the signal output from said signal inputting means during said pulse signal period; and means for recording on a recording medium, a signal output from said signal muting means during said pulse signal period and a signal output from said signal inputting means during other times.

BRIEF DESCRIPTION OF THE DRAWINGS

The above object and advantages of the present invention will become more apparent by describing in detail a preferred embodiment thereof with reference to the attached drawings in which.

FIG, 5 is a block diagram of a signal recording device according to the present invention.

DETAILED DESCRIPTION OF THE INVENTION

Figure 1:
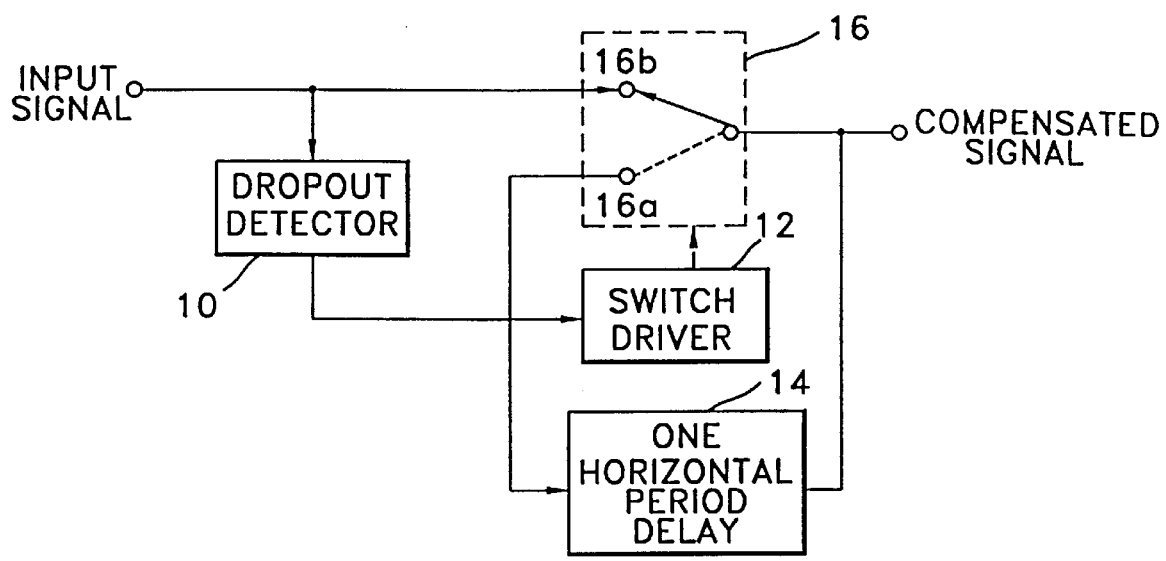
FIG. 1 is a schematic view of a dropout compensator in a general reproducing device.
Figure 2A:
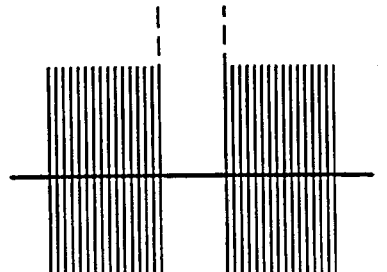
FIGS. 2A through 2E illustrate the waveforms of signals used for explaining the operation of the device shown in FIG. 1.
Figure 2B:
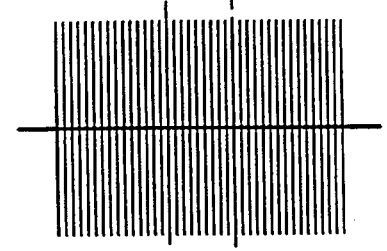
Figure 2C:
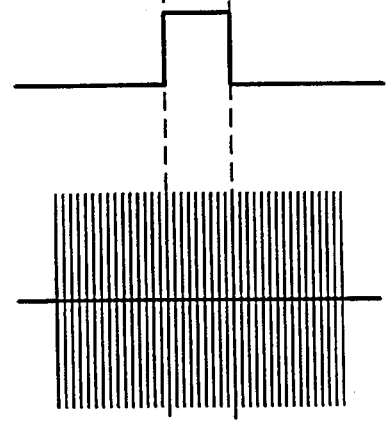
Figure 2D:
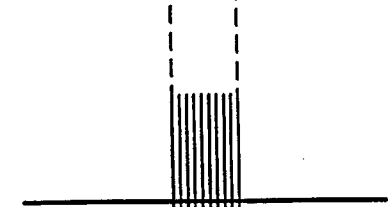
Figure 2E:
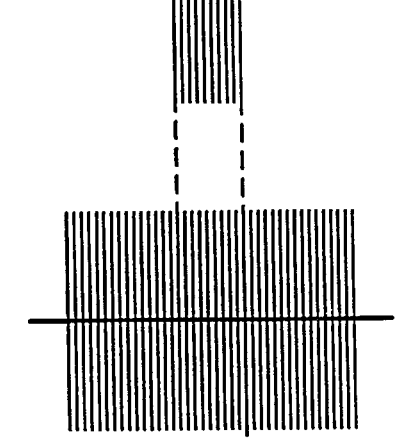
Figure 3:
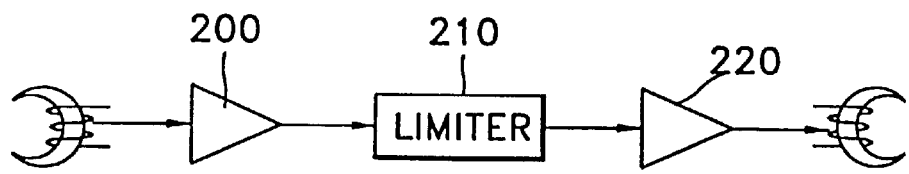
FIG. 3 is a block diagram of a conventional signal recording device.
Figure 4A:
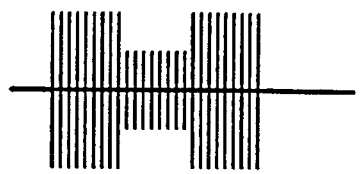
FIGS. 4A through 4C illustrate the waveforms of signals used for explaining the operation of the conventional signal recording device shown in FIG. 3.
Figure 4B:
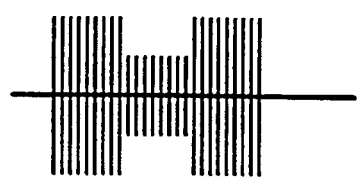
Figure 4C:
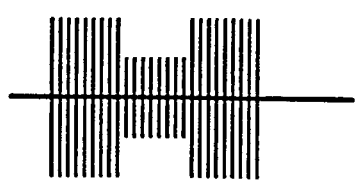
Figure 5:
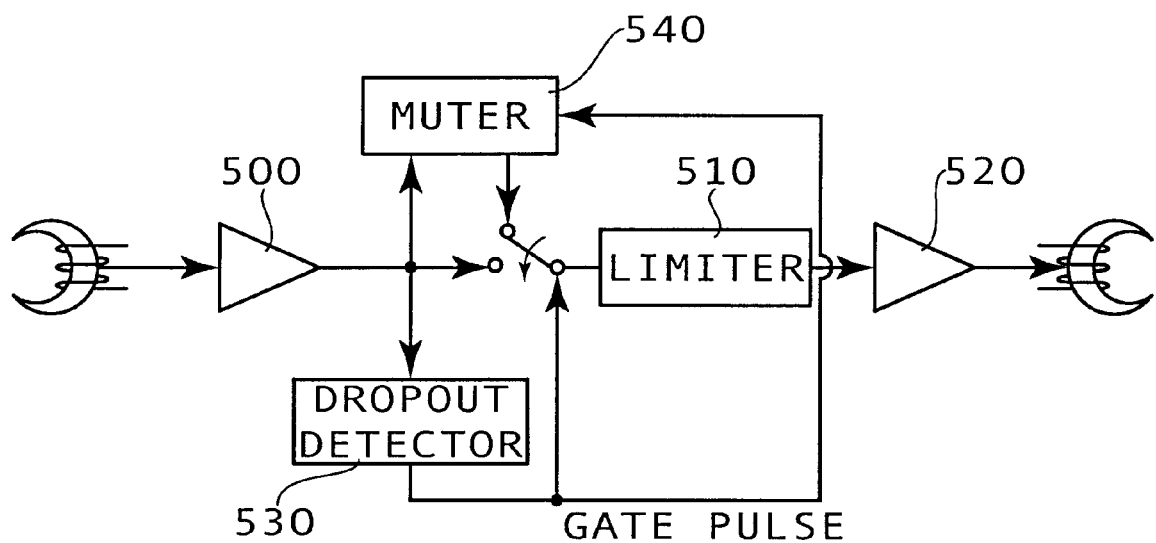

In FIG. 5, a signal recording device includes an input amplifier 500 for amplifying a small signal output from a head. Dropout detector 530 detects a dropout period from the signal output from the input amplifier 500 and generates gate pulses to be supplied to a muter 540. Muter 540 receives the signal output from the input amplifier 500 and mutes a reproduced signal synchronized with the gate pulses generated in the dropout detector 530. A limiter 510 limits the signal within a predetermined amplitude range, and recording amplifier 520 amplifies the signal output from the limiter 510. A recording device for reproducing the thus-recorded signal is the same as that shown in FIG. 1. Thus, a separate description of the reproducing device is unnecessary.

Figure 6A:
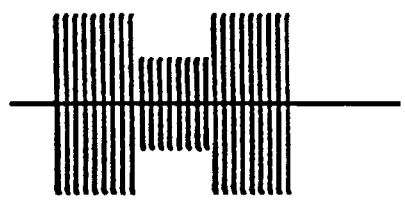
FIGS. 6A and 6B illustrate the waveforms of signals used for explaining the operation of the signal recording device of FIG. 5.
Figure 6B:
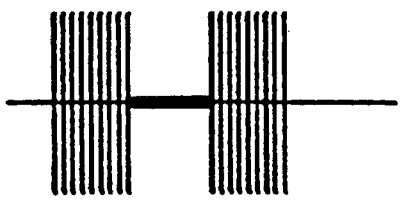

FIGS. 6A and 6B illustrate the waveforms of signals used for explaining the operation of the device shown in FIG. 5. FIG. 6A is the waveform of an input signal including a dropout signal, and FIG. 6B is the waveform of an output signal to be recorded, of which the dropout signal is muted.

When a dropout is produced in a signal picked up by a head, the dropout detector 530 detects the dropout period and generates a gate pulse during the dropout period. The muter 540 mutes the dropout signal synchronized with the gate pulse. The limiter 510 limits the amplitudes of the signal output from the muter 510 during the dropout period and the signal output from the amplifier 500 during the other period to a predetermined level. The selection of either the muter output or the amplifier output may be achieved by a switch according to the gate pulse. The signal output from the limiter 510 is amplified in the recording amplifier 520 and recorded on a recording medium. Thus, noise components during the dropout period are muted for recording.

Therefore, in the signal recording device of the present invention, since a signal during a dropout period is muted and recorded, for playback of the recorded signal, a DOC in a reproducing device identifies the muted signal period as the dropout period and accurately compensates for the dropout. Therefore, noise caused by the dropout can be prevented.

Although the present invention has been described in terms of a preferred embodiment, it will be appreciated that numerous modifications may be made to the described embodiment without departing from the spirit and scope of the invention.

What is claimed is:

1. A device for recording a signal so as to facilitate effective dropout compensation, comprising:

signal inputting means for inputting a signal to be recorded on a recording medium;

means for detecting a dropout portion of the signal output from said signal inputting means and generating a pulse signal corresponding to the detected dropout portion;

muting means for muting the signal output from said signal inputting means during a pulse period of said pulse signal;

means for limiting the signal from said muting means with a predetermined amplitude range; and means for recording on the recording medium, the muted input signal during said pulse period and the output from said signal inputting means at all other times.

2. The device according to claim 1, further comprising a switch disposed to convey a signal from one of: said muting means and said signal inputting means to said limiting means according to the gate pulse supplied by said drop out detecting means.

3. The device of claim 1, wherein said muting means suppresses a signal level of the input signal during the pulse period.

4. The device according to claim 3, wherein said muting means suppresses the input signal to substantially a zero level during the pulse period.

5. The device according to claim 1, wherein said signal inputting means provides the signal directly to said dropout detecting means and to said muting means.

6. A device for recording an input signal which contains one or more dropout portions, said device comprising:

a dropout detector which receives as an input the input signal, and which produces as an output a pulse signal having a pulse period which corresponds to a duration of a dropout portion of the input signal;

a muter which receives said pulse signal and mutes the input signal during the pulse period of said pulse signal;

a limiter which limits the input signal and muted signal output through the muter;

a recording head which receives an output signal from said limiter;

wherein dropout portions of the input signal are recorded by said recording head on a recording medium as muted portions so as to facilitate effective dropout compensation.

7. The device according to claim 6 further comprising: a switch disposed to convey one of:

said input signal and an output from said muter to said limiter according to the gate pulse supplied by said drop out detector.

8. The device for recording an input signal according to claim 6, wherein said device further comprises:

a reproducing head which produces as an output the input signal.

9. The device according to claim 6, wherein the muter suppresses a signal level of the input signal during the pulse period.

10. The device according to claim 9, wherein the muter suppresses the input signal to substantially a zero level during the pulse period.

11. A method for facilitating effective dropout compensation for an input signal which is to be recorded on a recording medium, said method comprising the steps of:

(a) detecting a dropout portion in the input signal to produce a pulse signal having a pulse period corresponding to the duration of the dropout portion;

(b) muting the input signal during the pulse period of said pulse signal to produce a muted portion of the input signal corresponding to each dropout portion;

(c) repeating steps (a) and (b) for all dropout portions in said input signal, to produce muted portions of the input signal corresponding to each dropout portion;

(d) recording the input signal onto the recording medium, including the muted portions, which correspond to each dropout portion.

12. The method according to claim 11, wherein step (b) further comprises:

passing said input signal to recording without muting when no dropout portion is detected during said step (a).

13. The method of claim 12 further comprises limiting the signal output by said step (b) prior to the said recording step.

14. The method for facilitating effective dropout compensation according to claim 13, wherein the input signal is a signal reproduced from a recording medium to be copied.

15. The method according to claim 11, wherein during step (b), the input signal is muted by suppressing a signal level of the input signal.

16. The method according to claim 15, wherein the input signal is muted by suppressing the signal level to a substantially zero level.

17. A device for recording an input signal which contains one or more dropout portions, said device comprising:

a dropout detector which receives as an input the input signal, and which produces as an output a pulse signal having a pulse period which corresponds to a duration of a dropout portion of the input signal;

a muter which receives as an input the input signal, and which mutes the input signal during the pulse period of said pulse signal;

a recording head which receives as an input the signal output through said muter;

wherein dropout portions of the input signal are recorded by said recording head on a recording medium as muted portions so as to facilitate effective dropout compensation.

* * * * *